United States Patent [19]

Idesawa

[11] Patent Number: 5,377,792
[45] Date of Patent: Jan. 3, 1995

[54] FRICTION PAD OF A DISC BRAKE FOR A VEHICLE

[75] Inventor: Isao Idesawa, Nagano, Japan

[73] Assignee: Nissin Kogyo Kabushiki Kaisha, Nagano, Japan

[21] Appl. No.: 778,892

[22] PCT Filed: Apr. 24, 1991

[86] PCT No.: PCT/JP91/00535
§ 371 Date: Dec. 20, 1991
§ 102(e) Date: Dec. 20, 1991

[87] PCT Pub. No.: WO91/16554
PCT Pub. Date: Oct. 31, 1991

[30] Foreign Application Priority Data
Apr. 23, 1990 [JP] Japan .................. 2-43361[U]

[51] Int. Cl.$^6$ .................. F16D 69/00; F16D 69/02
[52] U.S. Cl. .................. 188/264 G; 188/251 R
[58] Field of Search .......... 188/251 R, 251 A, 264 G, 188/73.1; 192/107 M

[56] References Cited

U.S. PATENT DOCUMENTS

| | | | |
|---|---|---|---|
| 2,158,337 | 5/1939 | Rasmussen | 188/251 R |
| 2,554,548 | 5/1951 | Albagnac | 188/251 R |
| 2,801,714 | 8/1957 | Dott | 188/251 A X |
| 4,022,302 | 5/1977 | Janssen | 188/73.1 |
| 4,373,615 | 2/1983 | Melinat | 188/73.1 |
| 4,742,948 | 5/1988 | Fisher et al. | |
| 5,103,942 | 4/1992 | Schmitt | 188/251 R |

FOREIGN PATENT DOCUMENTS

| | | | |
|---|---|---|---|
| 2165413 | 12/1971 | France | 188/251 A |
| 61-124739 | 6/1986 | Japan | |
| 62-255630 | 11/1987 | Japan | |
| 63-125836 | 5/1988 | Japan | |
| 1-320328 | 12/1989 | Japan | |
| 2174774 | 11/1986 | United Kingdom | 188/264 G |

Primary Examiner—Robert J. Oberleitner
Assistant Examiner—Peter M. Poon
Attorney, Agent, or Firm—Armstrong, Westerman, Hattori, McLeland & Naughton

[57] ABSTRACT

Disclosed is a friction pad of a disc brake for a vehicle. The friction pad has a lining, which contacts the brake disc with friction and is formed of a carbon composite material, and a coating layer formed of glass or a heat resistant resin on the back surface and side surfaces of the lining. The carbon composite layer is preferably a carbon-carbon composite or a glass-impregnated carbon material. Borosilicate glass is suitable as the glass.

3 Claims, 2 Drawing Sheets 4,377,792

FRICTION PAD OF A DISC BRAKE FOR A VEHICLE

BACKGROUND OF THE INVENTION

1. Field of the Invention

The present invention relates to a friction pad of a disc brake which is mounted on a vehicle, such as an automobile or a motorcycle.

2. Description of the Related Art

In a disc brake for controlling the action of a brake disc by a pair of friction pads, the brake disc is made of cast iron or a steel plate and the friction pads are made of a resin mold. Improvement in durability of the brake disc and the friction pads to a heat crack and fade, and their lightening in weight have been desired.

As disclosed in Japanese Unexamined Patent Publication No. 1-320328, for example, a carbon-carbon composite or a carbon-fiber reinforced carbon composite has been proposed as the materials for the brake disc and the friction pads.

Carbon fibers impregnated with a carbon matrix are subjected to carbonization and high densification treatment to provide the carbon-carbon composite. This composite has a great friction coefficient when combined with the same type of a material, and a small friction coefficient in a combination with a different type of a material. The carbon-carbon composite is therefore used for both the brake disc and the friction pads.

The carbon-carbon composite has a large friction coefficient in a high temperature range of about 100° C. or higher, and has excellent heat resistance, thermal shock resistances, and heat conductivity. This composite however has a great wear by oxidation rate in such a high temperature range, so as to deteriorate the durability of the friction pads and easily transmit heat caused by a braking operation to a hydraulic system.

Further, since the carbon-carbon composite is hardly bonded or fusion-bonded to other materials, the entire friction pad is integrally formed of the carbon-carbon composite as disclosed in the Japanese publication (No. 1-320328). This type of friction pad is inferior in rigidity to those provided with metal back plates, and will therefore be deformed by the pressure of a piston, or impart a soft brake feeling to a driver. Also as the carbon-carbon composite has high heat conductivity, an excellent insulator has to be attached to the back surface of the friction pad as a countermeasure for vapor-lock.

In this respect, it has been proposed to provide a friction pad which has a back plate of a different material coupled to a carbon-carbon composite lining by rivets or the like. Since a plurality of heavy rivets are used for this friction pad, the total weight of the pad increases even with the use of the carbon-carbon composite.

SUMMARY OF THE INVENTION

It is therefore an object of the present invention to provide friction pads of a disc brake for a vehicle, which can prevent an oxidative damage, and have excellent heat insulation.

A friction pad according to the present invention comprises a lining friction-engageable with a brake disc; and a coating layer formed on a back surface of the lining and a torque receiving surface on a side of the lining. The lining is formed of a carbon composite material, and the coating layer is made of either glass or a heat resistant resin.

According to another friction pad embodying the present invention, the coating layer is formed on the side of the lining in addition to the torque receiving surface.

The carbon composite material for the friction pad of the present invention is preferably a carbon-carbon composite or a glass-impregnated carbon material.

The carbon-carbon composite can be provided by subjecting the carbon-matrix impregnated carbon fibers to the carbonization and high densification treatment, as described above.

The glass-impregnated carbon material can be yielded by impregnating glass components into the carbon pores of the carbon-carbon composite.

Glass for the friction pad of the present invention is desirably borosilicate glass.

With the above structure, the friction pads of the present invention have enhanced rigidity and resistance against the pressure from a piston and a retarding torque, providing a good and strong brake feeling to a driver. Further, corrosion of the lining by oxidation can be prevented, improving the durability of the friction pads. The heat resistance of the friction pads is also increased, thus permitting the braking performance of the carbon composite material to be sufficiently and steadily demonstrated.

DETAILED DESCRIPTION OF THE PREFERRED EMBODIMENTS

Figure 1:
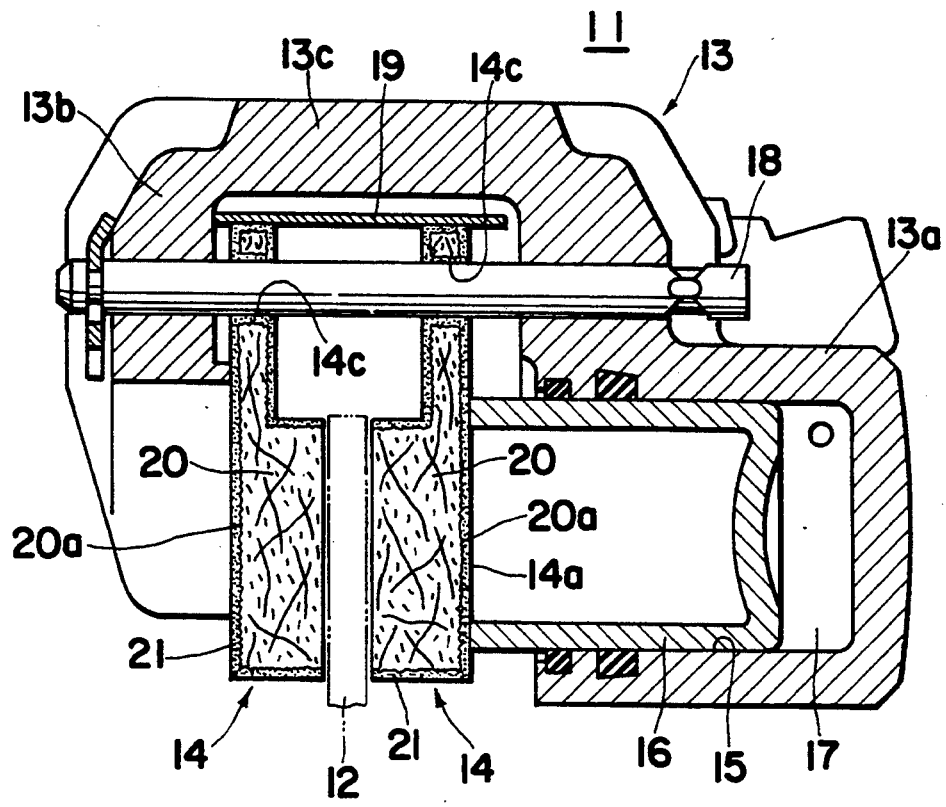
FIG. 1 is a cross section of a disc brake according to a first embodiment of the present invention.
Figure 2:
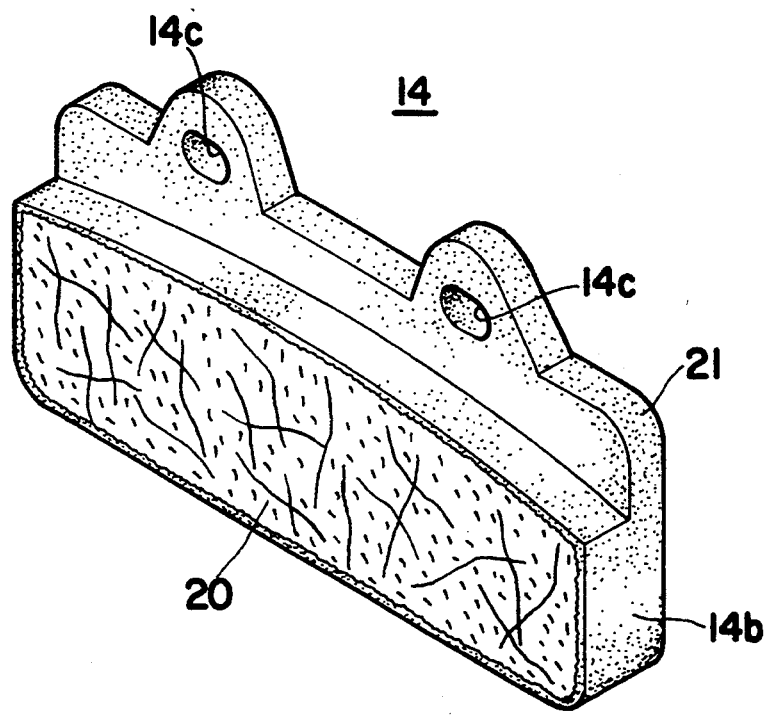
FIG. 2 is a perspective view of a friction pad.

A first preferred embodiment of the present invention will now be described referring to FIGS. 1 and 2.

A disc brake 11 comprises a brake disc 12 which rotates together with wheels, a caliper 13 to be provided over the outer surface of the brake disc 12, and a pair of friction pads 14 located face to face on the respective sides of the brake disc.

An acting portion 13a and a reacting portion 13b of the caliper 13 are coupled to each other by a bridge 13c. The acting portion 13a has a cylinder bore 15 which opens toward the brake disc 12. A piston 16 is inserted liquid-tight and slidable into the cylinder bore 15. A hydraulic chamber 17 is defined behind the piston 16.

The pair of friction pads 14 hang from hanger pins 18 penetrating through the bridge 13c in the axial direction of the brake disc 12. Further, a pad spring 19, attached inside the bridge 13c, urges the friction pads 14 toward the center of the brake disc 12.

The friction pads 14 each include a lining 20 contacting the brake disc 12 with friction, and a coating layer 21 formed on a back surface 20a and the entire side surfaces of the lining 20 and the inner surfaces of through holes for the hanger pins 18. The lining 20 is made of a carbon composite material, and the coating layer 21 is made of glass or a heat resistant resin.

A preferable carbon composite material for the lining 20 is a glass-impregnated carbon material, which is obtained by impregnating a resin or a pitch into long and short fibers of carbon or graphite, burning the resultant material for carbonization, and impregnating glass components into the resultant carbon-carbon composite or carbon pores included in that carbon-carbon composite.

The lining 20 is dipped into a solution of glass or a heat resistant resin to be impregnated with that material, or the lining 20 is coated, adhered with pressure, or sprayed with the glass or the heat resistant resin to form the coating layer 21.

Borosilicate glass is suitable as the mentioned glass because it is easily impregnated in the carbon-carbon composite and has higher rigidity and lower heat-conductance than the carbon-carbon composite, and is hardly oxidized.

The friction pads 14 therefore have enhanced rigidity and strength due to piston abutting surfaces 14a, torque receiving side surfaces 14b and through holes 14c covered with the coating layer 21 made of glass or a heat resistant resin. Therefore, the piston abutting surfaces 14a and the torque receiving surfaces 14b will not be deformed in the braking operation, providing a stronger and better brake feeling.

When braking-originated friction heat raises the temperature to 100° C. or above, the brake disc 12 and the friction pads 14 have large and steady friction coefficients, while the coating layer 21 maintains heat retaining property and heat insulation of the friction pads 14. The brake disc 12 and the friction pads 14 can therefore fully demonstrate the braking performance, and block heat transfer to the hydraulic system, thereby preventing vapor locking.

Since the coating layer 21 prevents the carbon-carbon composite from contacting air, wear by oxidation, such as falling off of the corners of the lining 20, can also be avoided.

As the brake disc 12 has large friction force when the carbon-carbon composites contact each other with friction, the brake disc 12 is preferably made of the same carbon composite material as the lining 20.

Figure 3:
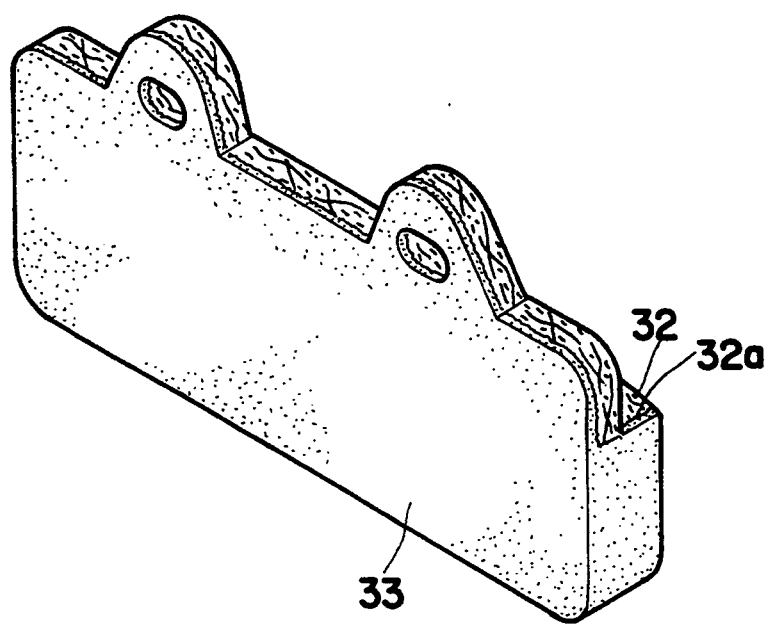
FIG. 3 is a perspective view of a friction pad according to a second embodiment of the present invention.

A second embodiment of the present invention will now be described referring to FIG. 3.

A friction pad 31 includes a lining 32 contacting the brake disc 12 with friction, and a coating layer 33 formed on the back surface and torque receiving side surfaces 32a of the lining 32. The lining 32 and the coating layer 33 are formed of the same materials as used in the first embodiment.

The friction pad 31 will therefore have improved strength against the pressure of the piston and the retarding torque as well as improved heat insulation.

In this embodiment, the coating layer 33 to be made on the back surface of the friction pad 31 may be formed only on the piston abutting portion.

What is claimed is:

1. A rigid friction pad of a disc brake for a vehicle comprising:
   a lining formed of a carbon-carbon composite material and friction-engageable with a brake disc; and
   a coating layer made of either glass or a heat resistant resin and formed on a back surface of the lining, a torque receiving surface on a side of the lining and on the sides of the lining.

2. A rigid friction pad according to claim 1, wherein the carbon-carbon composite material is a glass-impregnated carbon material.

3. A rigid friction pad according to claim 1, wherein the coating layer is a borosilicate glass.

* * * * *